(12) United States Patent
Jones et al.

(10) Patent No.: US 6,381,618 B1
(45) Date of Patent: Apr. 30, 2002

(54) METHOD AND APPARATUS FOR AUTOSYNCHRONIZING DISTRIBUTED VERSIONS OF DOCUMENTS

(75) Inventors: Jeffrey Allen Jones, Round Rock; Michael Wayne Brown, Georgetown, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/335,286

(22) Filed: Jun. 17, 1999

(51) Int. Cl.$^7$ .............................................. G06F 17/00
(52) U.S. Cl. ......................... 707/203; 707/10; 709/201
(58) Field of Search ....................... 707/1–10, 100–104, 707/200–206; 709/100–332

(56) References Cited

U.S. PATENT DOCUMENTS

| | | | |
|---|---|---|---|
| 5,625,818 A | 4/1997 | Zarmer et al. | 707/200 |
| 5,684,984 A | 11/1997 | Jones et al. | 707/10 |
| 5,694,597 A | * 12/1997 | Cantin et al. | 707/103 |
| 5,835,908 A | * 11/1998 | Bennett et al. | 707/10 |
| 5,842,214 A | * 11/1998 | Whitney et al. | 707/10 |

OTHER PUBLICATIONS

Sivaram et al., "Architectural support for efficient multicasting in irregular networks", Parallel and Distributed Systems, IEEE Transactions on, vol. 12, Issue 5, May 2001, pp. 489–513.*

Ghosh et al., "Quality-of-service routing in IP networks", Multimedia, IEEE Transactions on, Jun. 2001, vol. 3, Issue 2, pp. 200–208.*

Shaikh et al., "Evaluating the impact of stale link state on quality-of-service routing" Networking, IEEE/ACM Transactions on, vol. 9, Issue 2, Apr. 2001, pp. 162–176.*

* cited by examiner

*Primary Examiner*—Thomas Black
*Assistant Examiner*—David Jung
(74) *Attorney, Agent, or Firm*—Duke W. Yee; Jeffrey S. LaBaw; Stephen R. Loe

(57) ABSTRACT

Synchronizing copies of a first document in a distributed computing environment. According to a preferred embodiment, a path to a preferred repository for the first document and a path to a master repository for the first document are embedded in a second document. A copy of the first document is retrieved from the preferred repository. The master repository is checked to determine whether the retrieved copy is a copy of a most recent version of the first document. In response to the determination that the retrieved copy is the most recent version of the first document, the second document is formatted using the retrieved copy.

26 Claims, 7 Drawing Sheets

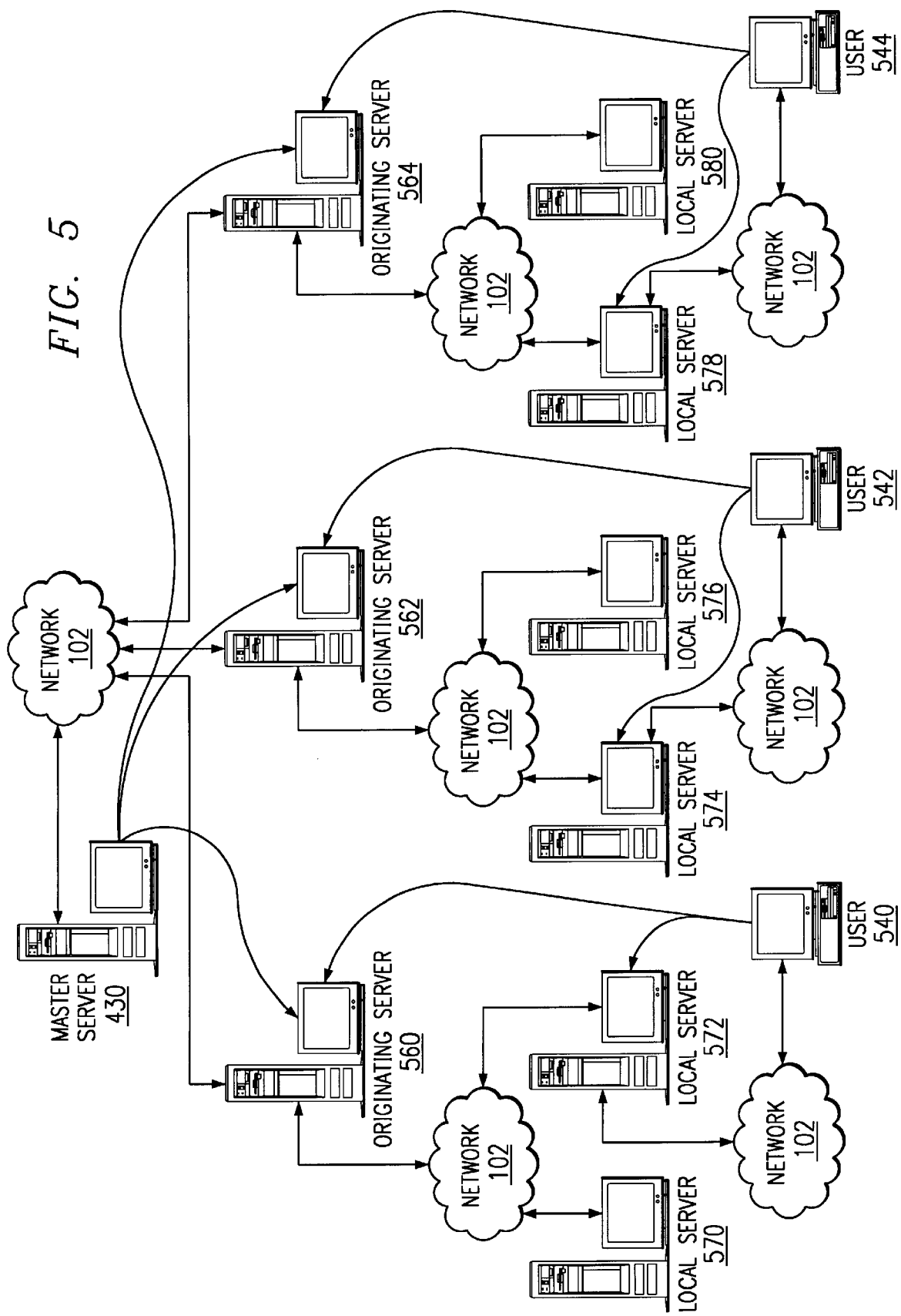

LOADING
ALGORITHM
800

FIG. 8

810 { Try to load image from location specified by "SRC"

820 {
If not loaded
　　For each "ALTSRC"
　　　　Try to load image from "ALTSRC"
　　　　　　If loaded abort looping through "ALTSRC"
　　End for . . .
Endif 830 {
If still not loaded
　　Try loading image from "MASTERSRC"
Endif 840 {
If still not loaded
　　Use "broken link" image
Endif Do idle time processing

CHECKING
ALGORITHM
900

FIG. 9

910 {
Package up info about image:
　　URL of referencing document
　　Local "SRC" name of image
　　"MASTERSRC" name
　　date/time stamp
　　size
　　checksum 920 { Send query to the server 930 {
If image is out of date
　　Load image from server
　　Replace old image in cache with new
　　Invalidate any places displaying the image
Endif

METHOD AND APPARATUS FOR AUTOSYNCHRONIZING DISTRIBUTED VERSIONS OF DOCUMENTS

BACKGROUND OF THE INVENTION

1. Technical Field

The invention relates generally to the field of computer software and more specifically to managing copies of a document in a distributed computing environment such as the Internet.

2. Description of Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of public records online may reduce operating costs.

Currently, content providers and/or authors, whether they be individuals or corporations, will normally attempt to distribute their resources (documents, logos, data, graphic, etc.) on the web in one of two ways: they either provide a server from which all of their resources must be loaded or they allow copies of their resources to be replicated at remote sites. One such example is advertising banners on web sites. Each of these methods has problems. With the former, the author's server(s) must have massive bandwidth to keep up with the enormous number of hits likely to be generated. Usually the bandwidth is insufficient, thus causing the advertisements to load slowly which therefore leads to otherwise "fast" pages to load slowly. This method also risks worldwide impact if the server fails.

With the second method, the advertiser all but completely gives up control. Synchronizing the documents/images/logos across the Internet is practically impossible. All the advertiser can do is provide updates and hope that the remote sites update the changes in a timely manner. Moreover, since each and every site must have a different (but identical) copy, possibly identified by a different name, and certainly identified by a different unique site/path/file name, the document/image must be retransmitted over the net to a user even if many copies have already been loaded to the user from other sites—for example, a ubiquitous Coca-Cola logo. Therefore, different names, or the same name on different sites, cause the browser to assume it is a different document/image/logo.

Therefore, it would be advantageous to have an improved method and apparatus for distributing documents.

SUMMARY OF THE INVENTION

The present invention provides a method for synchronizing copies of a first document in a distributed computing environment. A path to a preferred repository for the first document and a path to a master repository for the first document are embedded in a second document. A copy of the first document is retrieved from the preferred repository. The master repository is checked to determine whether the retrieved copy is a copy of a most recent version of the first document. In response to the determination that the retrieved copy is the most recent version of the first document, the second document is formatted using the retrieved copy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates an alternate embodiment of the present invention;

FIG. 8 depicts an example of pseudo code for implementing the document loading function of the present invention;

FIG. 9 illustrates an example of pseudo code for implementing the document checking function of the present invention.

DETAILED DESCRIPTION OF THE PREFERRED EMBODIMENT

Figure 1:
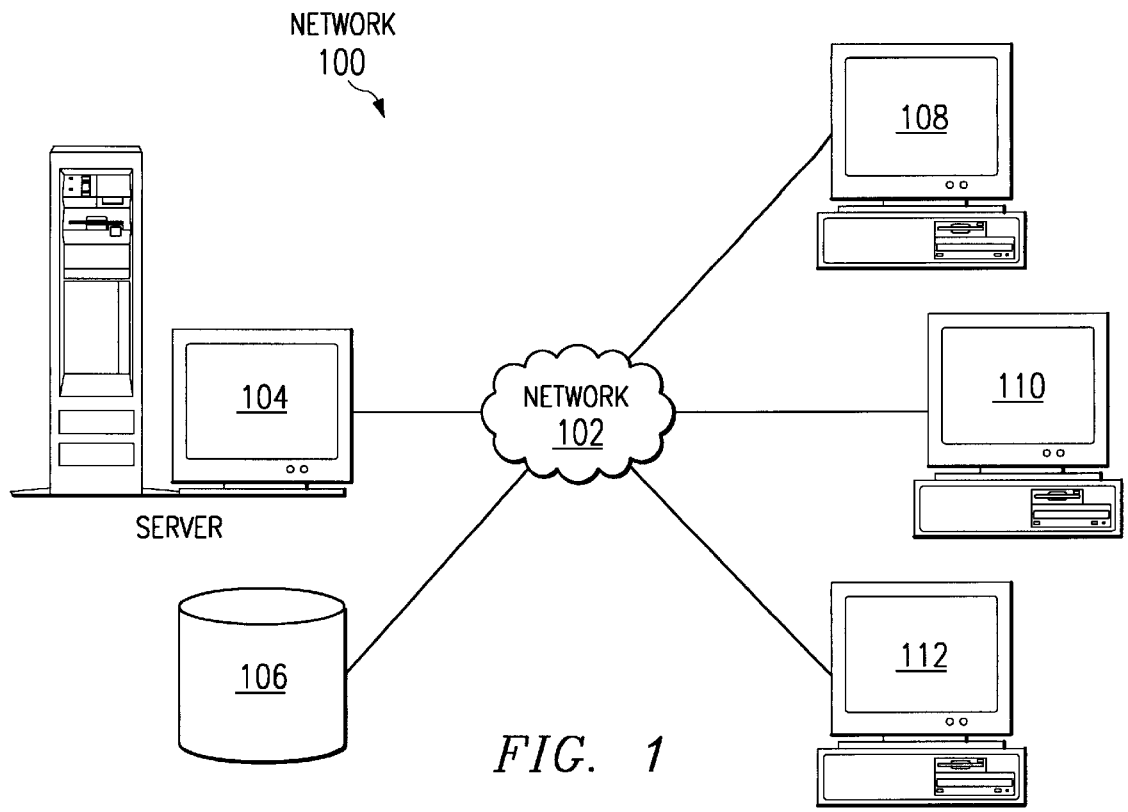
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program, data or other application from another computer coupled to the network. In the depicted example, server 104 provides data, such as boot files, operating system images and applications, to clients 108–112. Server 104 may also act as a repository for files (such as graphics files, documents, banners, advertisements, etc.) to be distributed to multiple clients and/or other servers. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. However, the present invention is not limited to the Internet and may be used with other networks including but not limited to local-area networks ("LANs") and wide-area networks ("WANs"). At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
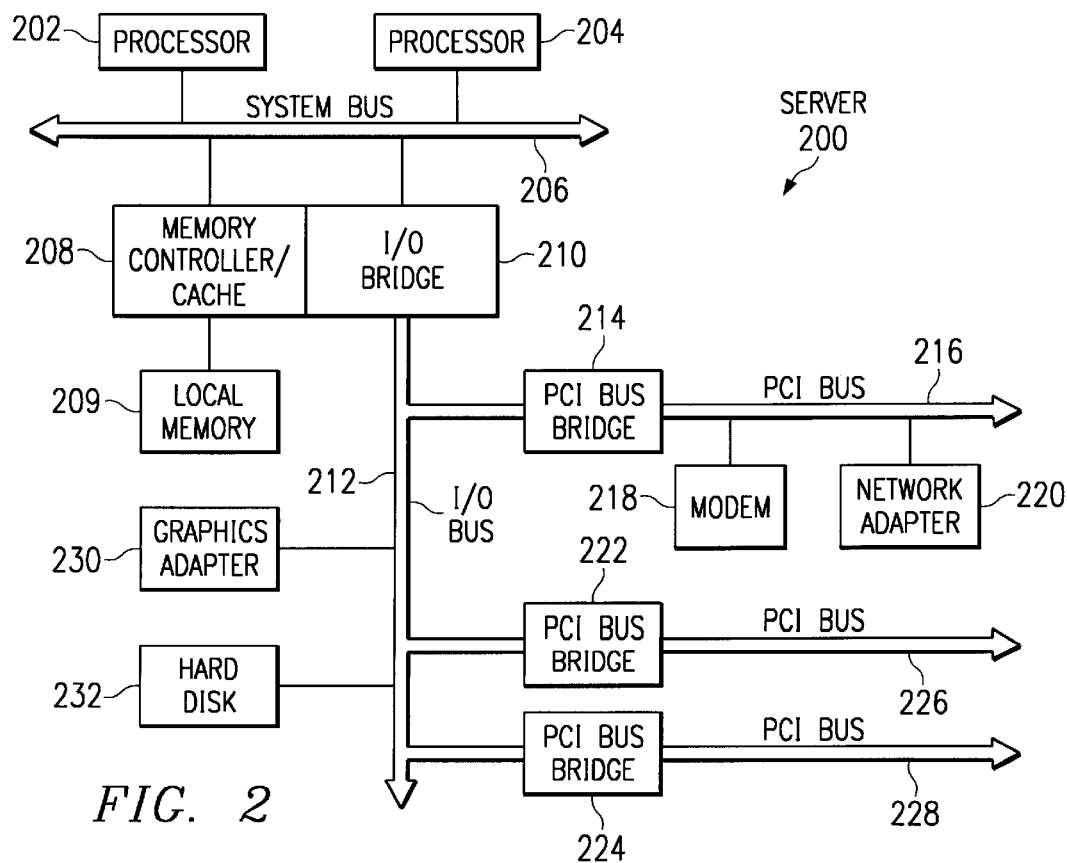
FIG. 2 depicts a block diagram of a data processing system which may be implemented in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
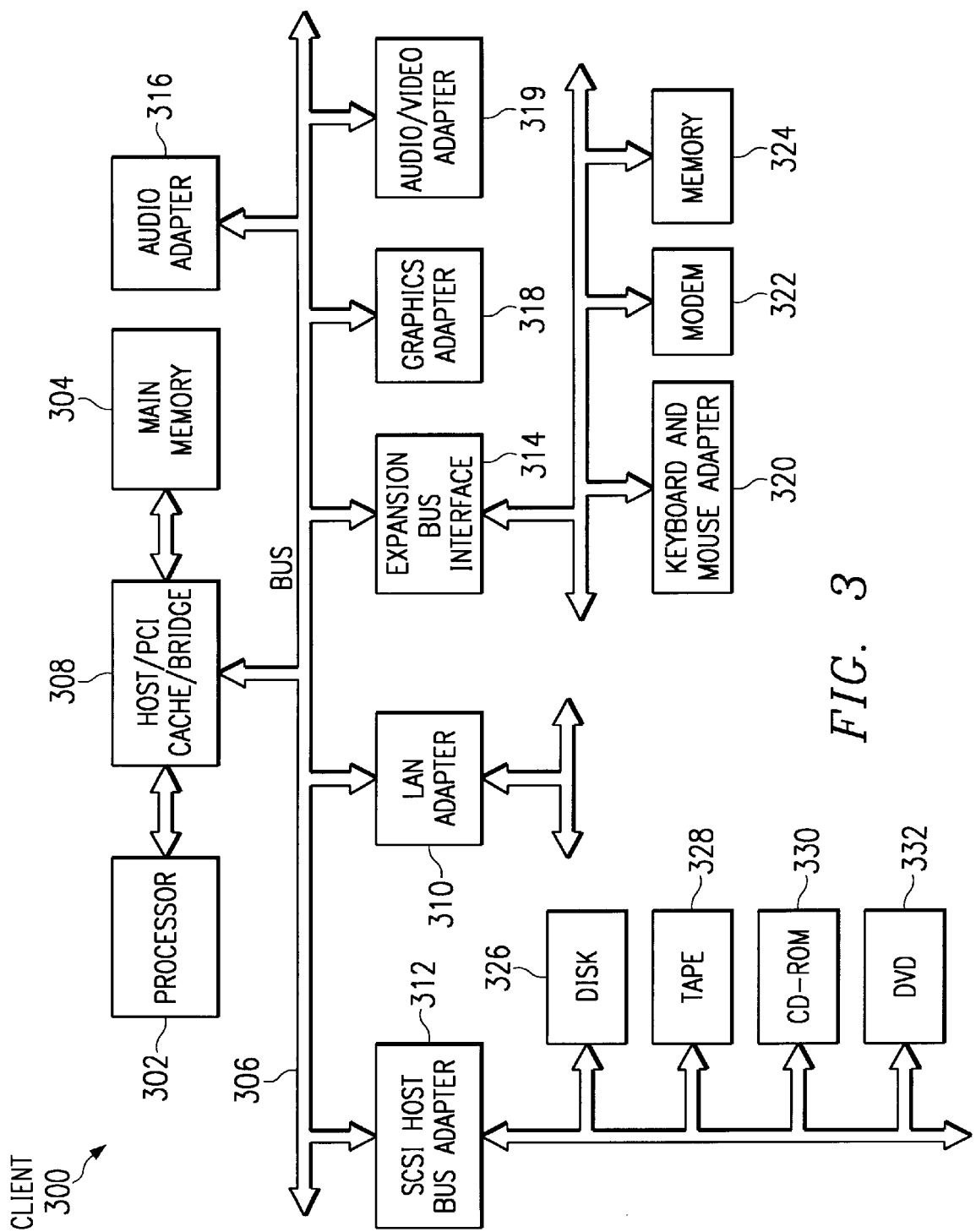
FIG. 3 depicts a block diagram of a data processing system.

With reference now to FIG. 3, a block diagram of a data processing system in which the present invention may be implemented is illustrated. Data processing system 300 is an example of a client computer. Data processing system 300 may also be used to run web browser software such as Netscape Navigator or Microsoft Internet Explorer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
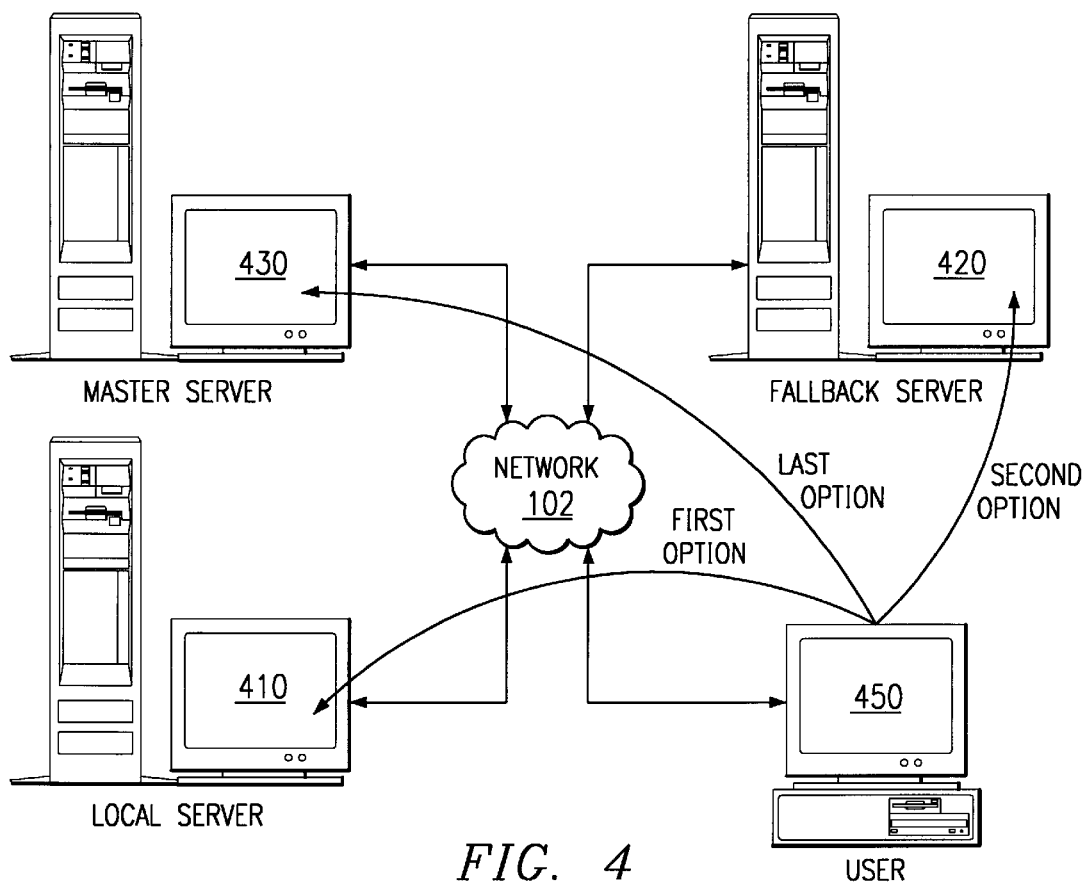
FIG. 4 illustrates a preferred embodiment of the present invention.

A preferred embodiment of the present invention is illustrated in FIG. 4. A web site located on local server 410 contains a target document specification (HTML links, etc.) containing multiple names and potential places that a target document can be found. The target document could be, for example, a graphics file, a documents, a banner, an advertisement, etc. One of the path names refers to a "preferred" location 410, one or more of the path names refer to one or more "fallback" locations 420 and one of the names refers to a "master" location 430. A web browser, such as Netscape Navigator or Microsoft Internet Explorer, loads the target document from the preferred location 410 via the network 102 to a user 450. This "preferred" location 410 will usually be a local site and will normally be the fastest copy of the target document for the browser to load.

During idle time, the browser checks the loaded version with the version on the "master" site 430 and updates the target document if necessary. If the target document is unavailable in the "preferred" location 410, the web browser checks the "fallback" location 420 and attempts to load the target document from this "fallback" location 420. If neither the "preferred" location 410 nor any of the "fallback" locations 420 are accessible, then the web browser loads the target document from the "master" location 430.

For example, the HTML might look like:

<IMG SRC="images/cokelogo.gif" WIDTH=129 HEIGHT=128> under the current system. However, using the present invention, the HTML would look something like:

<IMG SRC="images/cokelogo.gif" WIDTH=128 HEIGHT=128

ALTSRC="http://www.logoserver.com/coke/logos/coke.gif"

ALSTSRC=HTTP://www.fallback.com/images/gif/coke/logo.gif

MASTERSRC=http://www.cocacola.com/logos/coke.gif>

Thus, the "preferred" location is on the site that this HTML is loaded from via the relative link "images/cokelogo.gif". If that link fails (or perhaps because of poor performance of the local server), "logoserver.com" and "fallback.com" will be tried using the supplied names. If these links also fail, an attempt to retrieve the "master" copy from "cocacola.com" will be made. It should be understood that these HTML lines are typically tags embedded in the first document that the browser searches for.

After the original HTML document has been completely loaded, the master server is queried to make certain that the document/image/logo being displayed is an up to date one. However, if the master and fallback servers are unavailable, then no comparison is made. Alternatively, if the master and fallback servers are unavailable, the web browser continues to periodically attempt to access them for comparison of the current document to the master document.

Optionally, the fallback and master repositories are only checked if the copy in the preferred repository were older than a certain age, i.e., if the copy was older than one day old. Thus, unnecessary accessing of the master and fallback servers will be avoided.

An alternate embodiment of the present invention is illustrated in FIG. 5. In this embodiment, rather than each local server 570, 572, 574, 576, 578, and 580 linking back to the "master" server through the same system of "fallback" server(s) 420 as in the embodiment illustrated in FIG. 4, copies of the master document are created and stored on several "originating" servers 560, 562, and 564 and these "originating" servers 560, 562, and 564 act as "master" servers 430 for a discrete group of local 570, 572, 574, 576, 578, and 580 and fallback servers (not shown). These "originating" servers 560, 562, and 564 are connected to the "master" server via the network 102. The local servers 570, 572, 574, 576, 578 are connected to the corresponding "originating" servers 560, 562, and 564 via the network 102. Likewise, users 540, 542, and 544 are connected to the corresponding local servers 570, 572, 574, 576, 578 via the network 102. As will be obvious to one skilled in the art, more or fewer originating and local servers and more or fewer users could be utilized without departing from the scope and spirit of the invention. Therefore, the system illustrated in FIG. 5 is intended merely as an example and not as a limitation of the present invention.

The web browser for user 540 attempts to obtain the target document from the local server 572 on which the web page is located. If the web browser is unable to access the target document through local server 572 or any of its fallback servers (not shown), then the web browser for user 540 loads the target document from "originating" server 560. The web browser for user 542 loads the target document via local server 574 and, if that attempt and attempts on all "fallback" servers fail, via originating server 562. Similarly, the web browser for user 544 attempts to load the target document via local server 578 and, if that attempt and attempts on all "fallback" servers fail, via "originating" server 564.

The master server 430 "pushes" updates to the originating servers 560, 562, and 564 via the network 102 whenever the master target document is modified. The "originating" servers 560, 562, and 564 then "push" the update to the "fallback" servers which in turn "push" the update to the local servers 570, 572, 574, 576, 578. Thus, the author or owner of the target document is able to insure that the target documents being used is the correct up to date copy without slowing down the load time of the web page containing the reference to the target document.

Figure 6:
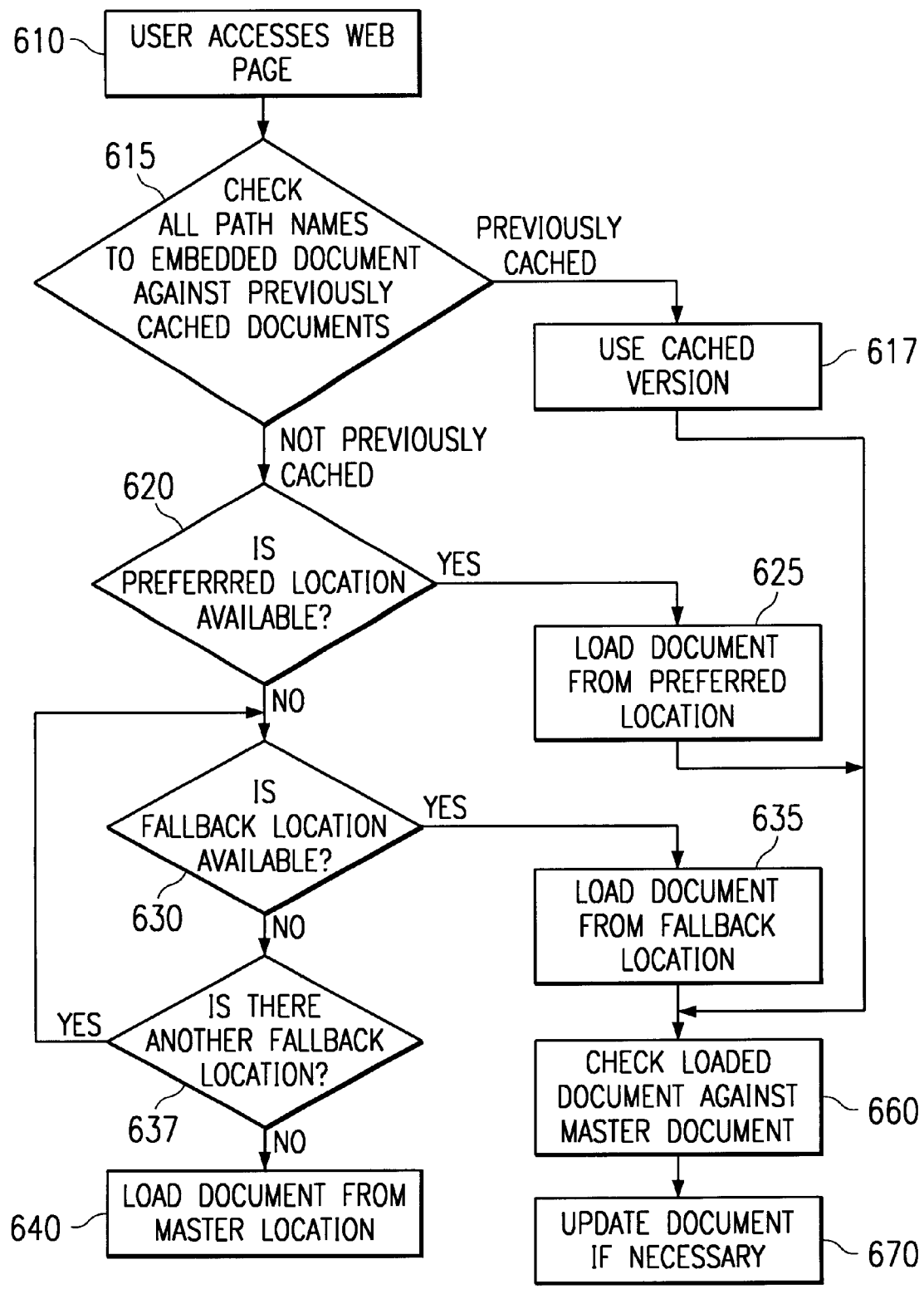
FIG. 6 depicts a flow chart of a preferred embodiment of the present invention.

A flow chart of a preferred embodiment of the present invention is depicted in FIG. 6. A user running a web browsing program such as Netscape Navigator accesses a web page containing multiple paths to a target document which are to be included in viewing the web page (step 610). The web browser checks the path names of all paths to the target document against the path names of previously cached documents (step 615). If one of the path names matches a previously cached document, the previously cached version is used in loading the web page (step 617). If the target document has not been previously cached, the web browser queries the preferred location to determine if the target document can be loaded from this location (step 620). If the target document is available from the preferred location, the web page is generated using the target document from the preferred location (step 625).

If the target document is unavailable from the preferred location, the web browser queries the first fallback location to determine if the target document is available (step 630). If so, then the web page is generated using the target document loaded from the fallback location (step 635). If the fallback location is unavailable, then the web browser determines if another fallback location is listed (step 637).

If there is another fallback location (step 637), then the web browser queries the next fallback location to determine if the target document is available (step 630) and the process continues as previously described. If there is not another fallback location (step 637), then the web page is generated using the target document loaded from the master location (step 640).

If the web page was generated using the target document loaded from either a cached version (step 617), a preferred location (step 625), or from a fallback location (step 635), the web browser checks the loaded copy of the target document against the version of the target document as it exists on the master location. If the two are different, the loaded target document is updated as necessary so as to be exactly the same as the target document located at the master location (step 670). An example of a condition which would make the target document unavailable from a particular location is when the server for that location is off-line.

Figure 7:
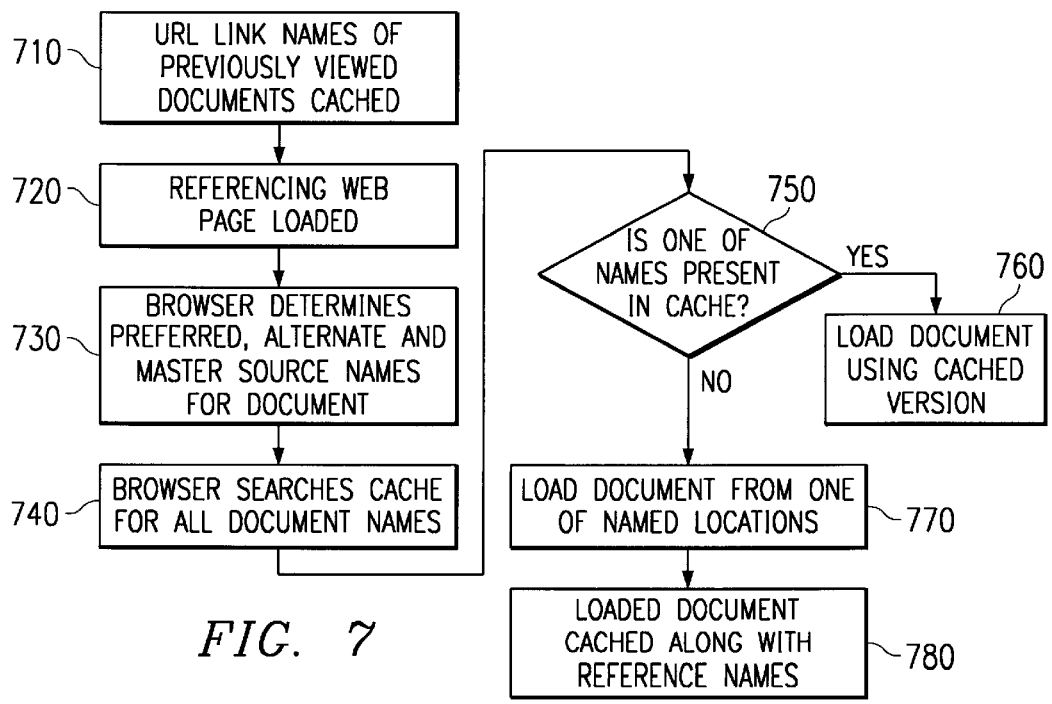
FIG. 7 depicts a flow chart of the caching mechanism of the present invention.

Further detail about the method of determining whether an image or document has been previously cached is provided herein with reference to the flowchart depicted in FIG. 7. When a web page is loaded, all reference names to any documents loaded with that web page are cached (step 710). These names include the preferred source name, the alternate source name(s), and the master source name. As a new web page is loaded (step 720), the browser determines the preferred, alternate(s), and master source names for each document included with the new web page (step 730). The browser then searches the cache for all of the reference names associated with the document (step 740) to determine if one of the reference names is present in the cache (step 740). If one of the reference names associated with the document matches a valid name associated with a document previously cached, the previously cached document is loaded (step 760). If none of the reference names associated with the document match a cached reference name, then the browser attempts to load the document from one of the locations provided by the web page (step 770). Once the document has been loaded, it will be stored in the cache along with each of the reference names provided by the web page (step 780). As long as the document remains in the cache, anytime that document is referenced in the future it will be loaded from the cache. Furthermore, multiple copies of the document will not be cached. Only one copy of the document will be in the cache. However this copy will also have attached to it all reference names associated with that document.

An example of a loading algorithm 800 suitable for loading an image from one of multiple locations is shown in FIG. 8. Section 810 instructs the browser to attempt to load the image from the preferred location, "SRC". If the browser is unable to load the image from the preferred location, section 820 instructs the browser to attempt to load the image from the first fallback site, "ALTSRC". Section 820 also instructs the browser to try each successive fallback site, "ALTSRC", until the image is successfully loaded or until each fallback site has been tried and has failed. If the image has not been loaded after the browser has tried all of the fallback sites, then section 830 instructs the browser to attempt to load the image from the master location, "MASTERSRC". If the browser is still unable to load the image, then section 840 instructs the browser to display a "broken link" image in the area of the display where the image was to have been located.

Checking algorithm 900 is depicted in FIG. 9. After the image has been loaded, during idle time, the browser checks to ensure that the image loaded was the most recent version of the image. Section 910 gathers data about the loaded image, such data including the uniform resource locator ("URL") of the referencing document, the local "SRC" name of the image, the "MASTERSRC" name of the image, the date/time stamp, the size of the image file, and the checksum. Section 920 instructs the browser to query the server where the master source, "MASTERSRC", is located to determine if the loaded image is out of date or if it is the most current version of the image. If the image is out of date, section 930 instructs the browser to load the image from the server containing the master copy of the image, "MASTERSRC". Section 930 further instructs the browser to replace the old image in the cache with the new image and to invalidate any places displaying the image.

Figure 10:
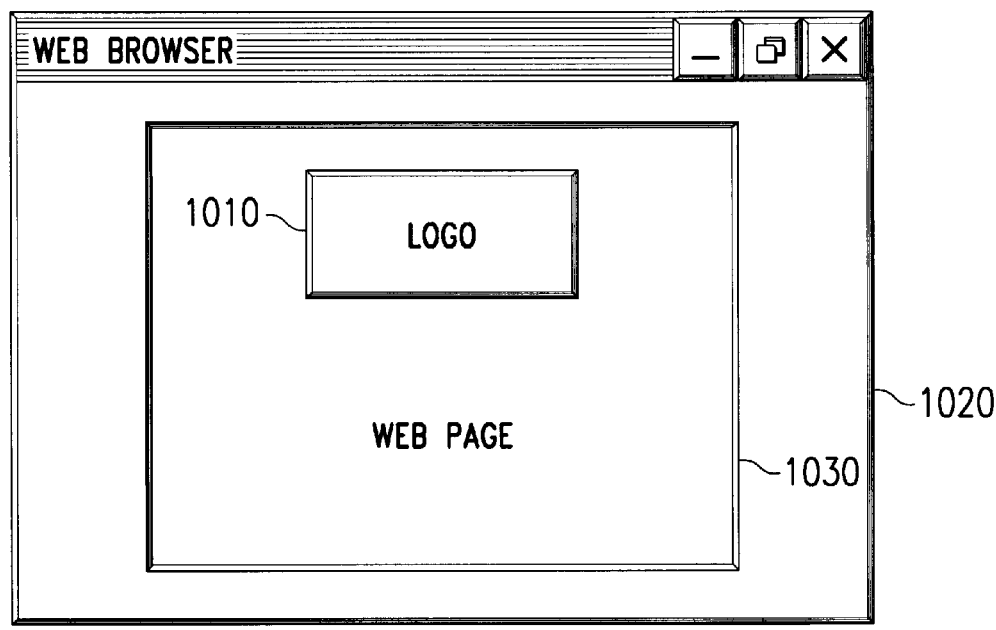
FIGS. 10–11 illustrate a screen images of a web browser.
Figure 11:
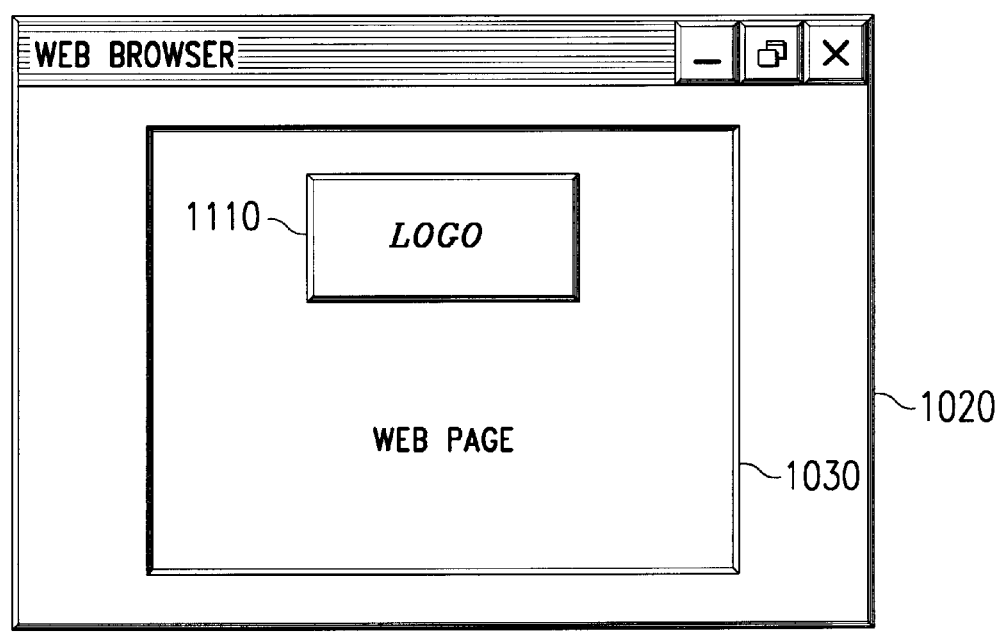

Reference to FIGS. 10 and 11 will aid in understanding the application of the present invention. Referring first to FIG. 10, a user using web browser 1020 loads web page 1030 from the web. Web page 1030 contains preferred, alternate, and master names by which to access logo 1010 to be displayed on web page 1030. The web browser 1020 loads logo 1010 from the preferred local server (usually the fastest method) and displays logo 1010 on web page 1030. During an idle time, the browser 1020 queries the master source location of logo 1010 to determine if the latest copy has been loaded. In this example, the latest version has not been loaded. Upon receiving notification from the master source that the loaded logo 1010 is out of date, the web browser 1020 loads the updated logo 1110 from the master source and displays it to the user as illustrated in FIG. 11. If, on the other hand, the loaded logo 1010 had been the latest copy of the logo 1010, then the image viewed by the user would have remained the same. Thus, the current invention enables owners of distributed documents to retain control over the content of the documents without slowing down the load times of web pages containing those documents.

Therefore, one advantage of this invention is that it allows web sites to have a fast local copy of third party files (logos, documents, banners, advertisements, etc.) while still allowing the author near real time control of the file. Furthermore, it allows the browser to recognize the identity of common documents/images by their common "master" and "alternate" names, decreasing the load time of pages and thereby decreasing the objectionability of having advertising on a page. The pseudo code depicted in FIGS. 8 and 9 was depicted using a linear algorithm for purposes of clarity in understanding the present invention. However, it should be noted that, for practical reasons, the actual algorithm used would probably be an event driven algorithm. It should also be noted that although "image" was used in FIGS. 8 and 9, any document type could be used and the hypertext markup language ("HTML") tags affected would be any tags that involve a "SRC" or SRC-like component. Furthermore, it should be noted that while the present invention has been described with reference to only one master location, the present invention is equally applicable to situations with multiple master locations as long as the author has direct control over the content of the documents at each master location. Additionally, the master source location could be a web server.

It is important to note that while the present invention has been described in the context of HTML, other markup languages, such as Extensible Markup Language, can also be used as will be obvious to one skilled in the art. Furthermore, it should be understood that the present invention applies to documents located on the world wide web (also called the "web"), the internet, an intranet, on local area networks, and wide area networks and that the preferred, fallback, and master sources may be located on these as well including various combinations of types of locations. It should also be noted that the documents may be web pages, but do not have to be. Furthermore, it should be noted that if the client is not able to access the master source, that the image can be updated from one of the fallback sources. Furthermore, although primarily described with reference to updating an image, it should be noted that this is given merely as an example and that image could be replaced by any type of document wherein the document may, for example, contain images, text, sound or combinations of these.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for synchronizing copies of a first document in a distributed computing environment, comprising the steps of:

embedding in a second document a path to a preferred repository for the first document and a path to at least one secondary repository for the first document;

retrieving a copy of the first document from the preferred repository;

checking with the secondary repository to determine whether the retrieved copy is a copy of a most recent version of the first document; and responsive to the determination that the retrieved copy is the most recent version of the first document, formatting the second document using the retrieved copy.

2. The method as recited in claim 1 wherein said secondary repository is a master repository.

3. The method as recited in claim 1 wherein said secondary repository is a fallback repository.

4. The method as recited in claim 1 wherein said path is identified by an HTML tag.

5. The method as recited in claim 1 wherein said path is identified by hypertext.

6. The method as recited in claim 1 wherein said first and second documents are located on the World Wide Web.

7. The method as recited in claim 1 wherein said first and second documents are located on the Internet.

8. The method as recited in claim 1 wherein said first and second documents are located on an Intranet.

9. A method for synchronizing copies of a first document in a distributed computing environment, comprising the steps of:

embedding in a second document a path to a preferred repository for the first document, a path to at least one fallback repository, and a path to a master repository for the first document;

querying a cache on a recipient computer to determine if a cached document having reference names matching any of said repositories;

responsive to a determination that a match exists, retrieving said first document from said cache;

retrieving a copy of the first document from the preferred repository if possible if unable to retrieve said first document from said cache;

retrieving a copy of the first document from the fallback repository if possible if unable to retrieve a copy of the first document from said cache or from said preferred repository;

retrieving a copy of the first document from the master repository if unable to retrieve a copy of the first document from said cache or from said preferred repository or from said fallback repository;

checking with the master repository to determine whether the retrieved copy is a copy of a most recent version of the first document;

responsive to the determination that the retrieved copy is the most recent version of the first document, formatting the second document using the retrieved copy;

responsive to the determination that the retrieved copy is not the most recent version of the first document, formatting the second document using a master copy of the first document retrieved from said master repository.

10. A method in a data processing system for accessing a document, comprising:

receiving a selection of a target document specification retrieval to retrieve a document associated with the target document specification, wherein the target document specification includes an identification of a preferred source and master source for the document;

retrieving the document from the preferred source to form a retrieved document; and querying the master source to determine whether the retrieved document is a current document.

11. The method as recited in claim 10 wherein the method is performed on a client machine further comprising:

responsive to an absence of a determination that the retrieved document is a current document, updating the retrieved document on the client machine using the current document located on said master source.

12. The method of claim 10, wherein the master source is a web server.

13. The method of claim 10, further comprising:

responsive to a determination that the retrieved document is a current document, displaying the retrieved document.

14. The method of claim 10, wherein the target document specification is a hypertext markup language link.

15. A method of retrieving documents in a distributed data processing system, comprising the steps of:

receiving a selection of a target document specification retrieval to retrieve a document associated with the target document specification, wherein the target document specification includes a preferred source identification, a plurality of alternate source identifications and a master source identification for the document;

querying a cache, wherein said cache comprises stored documents wherein each document comprises a multiplicity of source identifications, to determine if any source identifications match any of said preferred source identification, said plurality of alternate source identifications, or said master source identification; and responsive to a finding of a match, retrieving said target document from said cache.

16. The method of claim 15 further comprising the steps of:

responsive to an absence of a match, retrieving the document from the site of said preferred source identification if possible;

retrieving said document from one of a plurality of fallback locations identified by said plurality of alternate source identifications if possible if unable to retrieve a copy of said document from the location identified by said preferred source identification;

retrieving a copy of said document from the location identified by said master source identification if unable to retrieve a copy of said document from said location identified by said preferred source identification or from said location identified by said alternate source identification;

checking with the location identified by said master source identification to determine whether the retrieved copy is a copy of a most recent version of said document; and responsive to an absence of a determination that the retrieved copy is a copy of a most recent version of said document, updating the retrieved document.

17. The method of claim 16, further comprising:

responsive to a determination that the retrieved copy is a copy of a most recent version of said document, displaying the retrieved copy.

18. A method of retrieving documents from a distributed database, comprising the steps of:

receiving a document comprising a target document specification embedded in said document wherein said target document specification includes multiple target sources from which a target document may be retrieved;

querying a cache on a receiver's data processing system to determine if any cached document sources for any cached documents match any of said multiple target sources; and responsive to an absence of a match, retrieving said target document from one of said multiple target sources and caching said target document.

19. The method as recited in claim 18 wherein said target document specification is encoded in a markup language.

20. The method as recited in claim 18 wherein said target document specification is encoded in a hypertext markup language.

21. The method as recited in claim 18 wherein at least one of said multiple target sources is a web server.

22. The method as recited in claim 18 wherein at least one of said multiple target sources is located on a server linked to the Internet.

23. The method as recited in claim 18 wherein at least one of said multiple target sources is located on an Intranet server.

24. The method as recited in claim 18 wherein said document is a web page.

25. A computer program product in computer readable medium for synchronizing copies of a first document in a distributed computing environment, the computer program product comprising:

first instructions for embedding in a second document a path to a preferred repository for the first document and a path to a master repository for the first document;

second instructions for retrieving a copy of the first document from the preferred repository;

third instructions for checking with the master repository to determine whether the retrieved copy is a copy of a most recent version of the first document; and fourth instructions responsive to the determination that the retrieved copy is the most recent version of the first document, formatting the second document using the retrieved copy.

26. A system for synchronizing copies of a first document in a distributed computing environment, comprising:

means for embedding in a second document a path to a preferred repository for the first document and a path to a master repository for the first document;

means for retrieving a copy of the first document from the preferred repository;

means for checking with the master repository to determine whether the retrieved copy is a copy of a most recent version of the first document; and means for responsive to the determination that the retrieved copy is the most recent version of the first document, formatting the second document using the retrieved copy.

* * * * *